United States Patent [19]

Hays, Jr.

[11] 4,348,127

[45] Sep. 7, 1982

[54] CONNECTOR FOR EXTRUDED SECTIONS SUCH AS PICTURE FRAME MEMBERS

[76] Inventor: George O. Hays, Jr., P.O. Box 355, Summerville, S.C. 29483

[21] Appl. No.: 287,096

[22] Filed: Jul. 24, 1981

[51] Int. Cl.³ .......................... G09F 1/12; A47G 1/10
[52] U.S. Cl. ...................................... 403/9; 403/20; 403/402; 40/155
[58] Field of Search .................. 403/401, 402, 19, 20, 403/9, 6, 403, 205; 40/155

[56] References Cited

U.S. PATENT DOCUMENTS

| 2,078,744 | 4/1937 | Tursky | 40/155 |
| 2,293,615 | 8/1942 | Murphy | 403/9 |
| 3,191,243 | 6/1965 | Fernberg et al. | 403/401 X |
| 3,534,490 | 10/1970 | Herbert | 40/155 |
| 3,955,298 | 5/1976 | Kapstad | 40/152 |
| 4,095,361 | 6/1978 | Ledenican | 403/402 X |

Primary Examiner—Andrew V. Kundrat
Attorney, Agent, or Firm—Colton & Stone, Inc.

[57] ABSTRACT

A spring steel connector for extruded metal lengths such as picture frame members has, in addition to locking tines, a tine projecting in the opposite direction to permit release of the connector.

4 Claims, 7 Drawing Figures

CONNECTOR FOR EXTRUDED SECTIONS SUCH AS PICTURE FRAME MEMBERS

BACKGROUND OF THE INVENTION

The present invention relates to connectors for joining extruded metal lengths and, more particularly, to such a connector which is releasable and of single piece construction. Among the uses of the connectors are corner keys for metal picture frames.

The U.S. patent to Herbert, No. 3,534,490, discloses a picture frame construction employing extruded members having rearwardly opening channels for receiving corner keys connecting the members. Small set screws are threaded through the corner keys to secure the connections. While this frame construction provides an attractive and widely used frame, the use of small set screws in joining the frame sections together presents disadvantages as such screws are difficult to handle and easily lost during assembly of the frame. Also, with screw connections, it is possible for the screw to loosen with the possible opening of the frame corners with subsequent damage to the glass and/or artwork contained in the frame.

The use of corner keys for picture frames which have spring tabs for locking the frame sections together has been proposed. Typical connectors of this type are shown in the U.S. patents to Tursky, No. 2,078,744; Fernberg et al, No. 3,191,243; and Kapstad, No. 3,955,298. These connectors, however, are not readily releasable.

It is a primary object of the present invention to provide a connector for extruded sections such as picture frame members which is of single piece construction, eliminating the necessity of using separate screws, and which is readily releasable when desired.

A further object of the invention is the provision of such a connector which is economical to manufacture.

BRIEF SUMMARY OF THE INVENTION

The above and other objects of the invention which will become apparent hereinafter are achieved by the provision of a connector formed of flat spring steel stock having first and second legs insertable into slots in the members to be joined, each leg including a tab portion bent at a slight angle relative to the leg and terminating in three tines, the outer two of which are angled further in the same direction as the tab and serve to lock the connector in the slot and the center one of the tabs being bent in the opposite direction so as to be engageable by a screwdriver blade for release of the connector.

For a more complete understanding of the invention and the objects and advantages thereof reference should be had to the following detailed description and the accompanying drawings wherein preferred embodiments of the invention are described and illustrated.

DETAILED DESCRIPTION OF THE PREFERRED EMBODIMENTS

Figure 1:
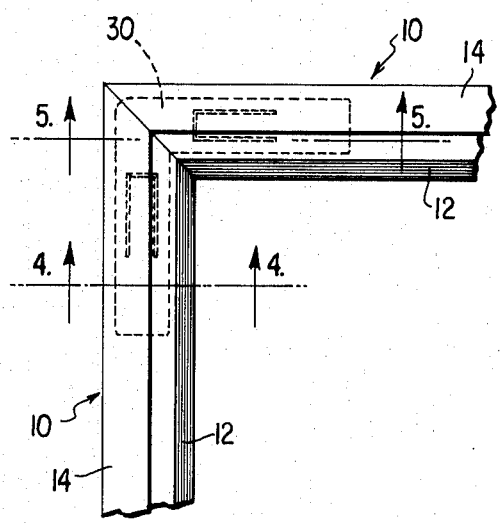
FIG. 1 is a fragmentary front elevational view of a picture frame corner employing the connector of the present invention.

The embodiment of the invention shown in FIGS. 1-6 is a corner key serving to connect together extruded metal sections forming a picture frame. These sections 10 may be of the type shown in the abovementioned U.S. patent to Herbert, No. 3,534,490. Each section 10 has rear and front flanges 12 and 14, respectively, connected by a side wall 16 and defining a groove 18 for reception of the edges of the material being framed. The rear flange 12 is provided with a continuous slot 20 of T-shaped cross-sectional configuration having a rearwardly facing opening 22. A similar slot 24 may be provided in the front flange 14, this slot also having a rearwardly facing opening 26. The frame sections 10 are secured together by means of locking corner keys 30 inserted into the slots 20 from the ends thereof. Additionally, flat angle brackets 32 may be provided in the slots 24.

Figure 2:
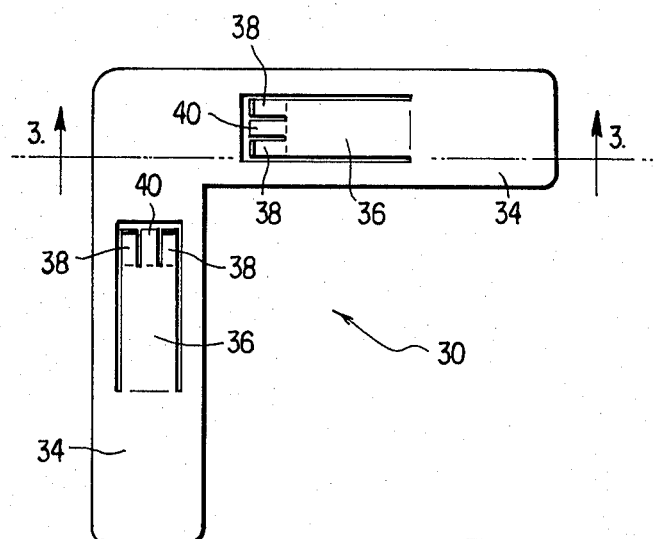
FIG. 2 is an elevational view of the connector.
Figure 3:
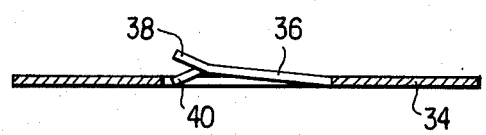
FIG. 3 is a transverse sectional view taken on the line 3—3 of FIG. 2.

As is shown in FIGS. 2 and 3, the key 30 of the present invention comprises a single piece of spring steel having two legs 34 extending at right angles to one another. An elongated tab 36 is formed in each leg 34, the tab being bent at an angle of approximately 8° from the plane of the leg. The free end of the tab is notched to form three tines 38 and 40, the two side tines 38 being bent in the same direction as the tab relative to the plane of the leg while the central tine 40 is bent in the opposite direction. Preferably, the ends of the tines 38 are cut at an angle to provide chisel-like points. The width of each leg 34 of the connector 30 is nearly equal to the width of the slot 20 in the frame section 10 and the width of the tab 36 is slightly less than that of the opening 22. The angling of the tab 36 and tines 38 is such that the distance from the tips of the tines 38 to the opposite face of the leg 34 is slightly greater than the distance between the front and rear walls 42 and 44, respectively, of the slot 20.

The key 30 is inserted into the slot 20 of the frame member 10 with the tines 38 toward the front wall 42. When the key is so inserted, the ends of the tines 38 bear against the wall 42 and flexure of the tab 36 forces the lateral portions of the leg 34 into engagement with the rear wall 44 thus clamping the key in position. As the points of the tines 38 are chisel-like, they serve to prevent inadvertent withdrawal of the key from the slot 20.

Figure 4:
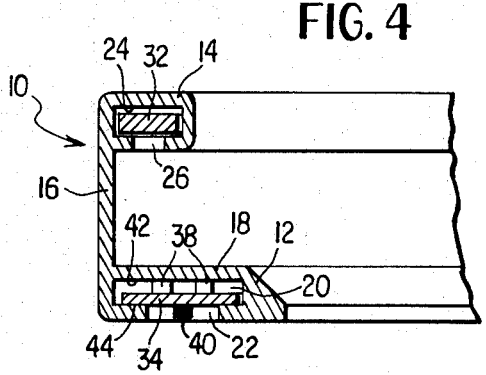
FIGS. 4 and 5 are fragmentary transverse sectional views taken on the lines 4—4 and 5—5, respectively, of FIG. 1.
Figure 5:
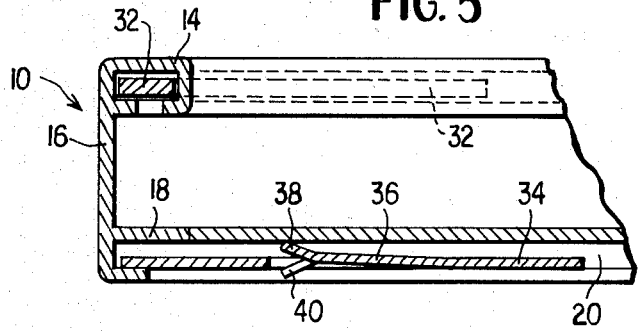
Figure 6:
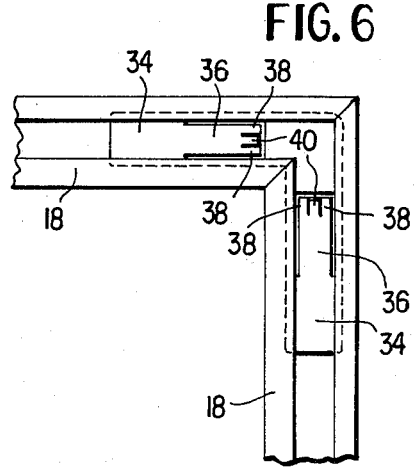
FIG. 6 is a fragmentary rear elevational view of the picture frame corner.

The center tine 40 provides a means for releasing the key 30 when desired. As can be seen in FIGS. 4 and 5, this tine projects into the opening 22 of the slot 20. By inserting the tip of a screwdriver under the tine 40, the tab 36 and tines 38 may be forced away from the front wall of the slot and the key removed.

Figure 7:
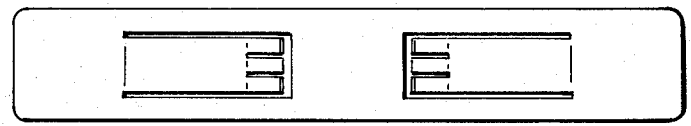
FIG. 7 is an elevational view of a modified connector according to the present invention.

While the embodiment of the invention described above is intended for use as a corner connector for picture frame members, it will be apparent that the connector has other uses. FIG. 7 depicts a modification of the invention which may be used to connect two extruded lengths in a lineal fashion.

While preferred embodiments of the invention have been illustrated and described, modifications may be made therein. Accordingly, reference should be had to the appended claims in determining the true scope of the invention.

I claim:

1. The improvement in a corner key for a picture frame assembly of the type having extruded metal frame sections, each section having front and rear flanges connected by a wall portion and defining a channel for reception of the edge portions of material being framed, at least the rear flange having a slot rearwardly opening and of T-shaped cross-section, said corner key comprising:

a spring steel member having first and second legs extending at right angles to one another and slideable into said slot, each leg having a tab formed therein, said tab extending along the principal axis of said leg, having its free end toward the juncture of said legs, and terminating in three tines, said tab being bent at a small angle relative to the plane of said legs, the two lateral tines being bent further in the same direction as said tab and the center tine being bent in the opposite direction.

2. The improvement in a connector for joining extruded metal sections each having an open-sided slot of T-shape configuration, said connector comprising:

a spring steel member having first and second leg portions extending from a common juncture and slideable into said slot, each leg having a tab formed therein, said tab extending along the principal axis of the leg, having its free end toward said juncture of said legs, and terminating in three tines, said tab being bent at a small angle relative to the plane of said legs, the two lateral tines being bent further in the same direction as said tab and the center tine being bent in the opposite direction.

3. The connector of claim 2 wherein said first and second legs extend in opposite directions from said juncture, forming a straight-line connector.

4. The connector of claim 2 wherein said first and second legs extend at right angles to one another from said juncture, forming a right-angle connector.

* * * * *